United States Patent
Dietz et al.

(10) Patent No.: US 6,823,077 B2
(45) Date of Patent: Nov. 23, 2004

(54) SIMPLIFIED INTERPOLATION FOR AN OPTICAL NAVIGATION SYSTEM THAT CORRELATES IMAGES OF ONE BIT RESOLUTION

(75) Inventors: Zachary Dietz, Logmont, CO (US); Charles E Moore, Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 683 days.

(21) Appl. No.: 09/918,202

(22) Filed: Jul. 30, 2001

(65) Prior Publication Data

US 2003/0021446 A1 Jan. 30, 2003

(51) Int. Cl.⁷ .............................. G06K 9/00; G09G 5/00
(52) U.S. Cl. ........................................ 382/107; 345/156
(58) Field of Search ........................ 250/221; 345/160, 345/161, 168, 156, 158, 175, 163, 164, 165, 166, 167; 382/107, 315, 321

(56) References Cited

U.S. PATENT DOCUMENTS 5,578,813 A * 11/1996 Allen et al. ............... 250/208.1
6,057,540 A *  5/2000 Gordon et al. ............. 250/221
6,233,368 B1 *  5/2001 Badyal et al. ............. 382/307
6,303,924 B1 * 10/2001 Adan et al. ............... 250/221
6,603,111 B2 *  8/2003 Dietz et al. ............... 250/226

* cited by examiner

Primary Examiner—Leo Boudreau
Assistant Examiner—Tom Y Lu
(74) Attorney, Agent, or Firm—Edward L. Miller

(57) ABSTRACT

Interpolation along an axis is performed on a Correlation Surface Array that was created from counting the instances of difference (XOR) between corresponding pixels of single bit resolution images having trial displacements. The interpolation is performed by finding the intersection of two straight line segments that are identified by the shape of the cross section of the Correlation Surface along the axis of interest. In the case of nine trial shifts there are three values in such a cross section, and they may seen as representing three points whose abscissas are the pixel shift amounts minus one, no shift, and plus one, and whose ordinates are the corresponding correlation values. In situations where navigation (and interpolation) is possible, these three points will have certain properties. The ususal case is that two of the points determine one line having a slope m, and the other point determines the other line (assumed to have slope -m). The three points may also lie along the same line, although this represents an exceptional case that may be handled differently. The three points might also describe other conditions that are associated with Correlation Surfaces that are not suitable for navigation, and these are ignored. In the usual case the point of intersection for the two lines is found and its abscissa is the interpolated value for motion along the axis of interest.

6 Claims, 8 Drawing Sheets

SIMPLIFIED INTERPOLATION FOR AN OPTICAL NAVIGATION SYSTEM THAT CORRELATES IMAGES OF ONE BIT RESOLUTION

REFERENCE TO RELATED APPLICATIONS

The subject matter of the instant Application is related to that of U.S. Pat. No. 6,057,540 entitled MOUSELESS OPTICAL AND POSITION TRANSLATION TYPE SCREEN POINTER CONTROL FOR A COMPUTER SYSTEM filed 30 Apr. 1998, and is also related to the subject matter described U.S. Pat. No. 5,578,813 filed 2 Mar. 1995, issued 26 Nov. 1996 and entitled FREEHAND IMAGE SCANNING DEVICE WHICH COMPENSATES FOR NON-LINEAR MOVEMENT. These two Patents describe techniques for the tracking of position movement, which techniques include components of the preferred embodiment described below. Accordingly, U.S. Pat. Nos. 6,057,540 and 5,578,813 are hereby incorporated herein by reference.

The subject matter of U.S. patent application entitled IMAGE FILTERS AND SOURCE OF ILLUMINATION FOR OPTICAL NAVIGATION UPON ARBITRARY SURFACES ARE SELECTED ACCORDING TO ANALYSIS OF CORRELATION DURING NAVIGATION, Ser. No. 09/845,544 and filed on 30 Apr. 2001, while not essential to the understanding of the present invention, are nevertheless of interest thereto, as it describes a filtering technique that produces reference and sample frames that are of single bit resolution. The present invention is of particular use when the image data has been reduced to single bit resolution. And while other techniques might be used to accomplish that resolution reduction, the use of the filter described in the Application cited above is preferred. Accordingly, U.S. Patent Application entitled IMAGE FILTERS AND SOURCE OF ILLUMINATION FOR OPTICAL NAVIGATION UPON ARBITRARY SURFACES ARE SELECTED ACCORDING TO ANALYSIS OF CORRELATION DURING NAVIGATION is hereby expressly incorporated herein by reference.

BACKGROUND OF THE INVENTION

Modern optical navigation upon arbitrary surfaces produces motion signals indicative of relative movement along the directions of coordinate axes, and is becoming increasingly prevalent. It is used, for instance, in optical computer mice and fingertip tracking devices to replace conventional mice and trackballs for the position control of screen pointers in windowed user interfaces for computer systems. It has many advantages, among which are the lack of moving parts that accumulate dirt and suffer the mechanical wear and tear of use. Another advantage for newer types of optical mice is that they do not need a mouse pad, since they usually employ sophisticated techniques that are generally capable of navigating upon arbitrary surfaces, so long as those surfaces are not optically featureless.

Modern optical navigation operates by tracking the relative displacement of images. In a preferred embodiment, a two dimensional view of a portion of the surface is focused upon an array of photo detectors, whose outputs are digitized, and then perhaps spatially filtered to remove grain or other objectionable artifacts from the image. The resulting image is then stored as a reference image in a corresponding array of memory, which array may be referred to as a "reference frame." A brief time later a sample image is also digitized, and perhaps also spatially filtered before being stored as a "sample frame." If there has been no motion, then the sample image (i.e., the sample frame) and the reference image (reference frame) are identical (or very nearly so). What is meant, of course, is that the stored arrays appear to match up (i.e., they already "correlate", without further manipulation). If, on the other hand, there has been some motion, then the sample image will appear to have shifted within its borders, and the digitized arrays will no longer match (that is, if their borders are also lined up). The matching process is termed "correlation" and may be performed in various ways, a conventional one of which is described in the incorporated Patents. Considered in isolation, correlation answers the narrow question "Are these two images aligned?" When the answer is "NO," it could be because of intervening motion in any direction, in which case some additional mechanism is needed to find the direction and amount of displacement that will produce correlation results of "YES" or "ALMOST." What is done is to perform correlations between one of the stored images (say, the sample image) and a collection of nine shifted trial versions of the other (reference) image. These nine shifted trial versions are: no shift; one over; one over and one up; one up; one over the other direction; etc., for eight actual shifts and one "null" shift. We would then expect that one of these nine correlations would be better than all the others, and its direction and amount of shift is taken as an indication of the intervening motion. (Either frame could, in principle, be the one that is trial shifted.)

On the other hand, an answer of "NO" could also occur because the two images are really quite different, either because the mouse velocity is really high, or because some other pernicious mischief is afoot. Whatever the reason, if this is the case then no trial shift will produce correlation, and we can't navigate using those images. The best we can do in such a circumstance is recognize it and respond in an appropriate and graceful manner.

Now, a navigation mechanism must avoid losing track of its changes in position, and if the above strategy were, by itself, the sole method of navigation, it would place quite a burden on the system through the imposition of a continuous high sample rate, even when there is no motion (which for a mouse is most of the time). Such high duty cycles can have consequences that increase the cost of a manufactured navigation mechanism, and for its power consumption during operation. The issue of power consumption bears particularly on the ability to provide a practical optical mouse that is "cordless" or "wireless," since it is apt to be battery powered.

For those and other reasons, the navigation mechanism maintains velocity (speed and direction) information. When a new sample frame is to be correlated with the reference frame a predicted shift can be used as the starting point for the nine trial shifts. The predicted shift is obtained from the velocity in conjunction with the elapsed time between samples, and may be many pixels in length. With this arrangement the correlation results contribute to an updated velocity and either ratify or modify the motion just predicted. Prediction is used to cumulatively "pre-shift" the reference frame, until such time as the new sample frame fails to overlap a significant portion of the shifted reference frame. At that time a new reference frame is taken. Among the benefits of such prediction is an increased allowable mouse velocity and a lowered power consumption and frame rate during period of small or zero velocity.

Now, it is generally the case that the reference frame/ sample frame misalignment is produced by an amount of intervening motion that does not correspond exactly to the pixel size of the optical navigation mechanism. It is in these (typical) cases that the correlation process indicates the "ALMOST" answer mentioned above. In fact, an interpolation mechanism allows the detection of motion with a resolution that is substantially better than the mere pixel size. Here is a simplified explanation of why this is possible.

Refer to FIG. 1, wherein is shown a depiction 1 of an array 2 of photo-sensitive sensors (e.g., photo-transistors). The photo sensors are arranged into a square array of seven rows (t through z) and seven columns (a through g). We have shown seven rows and seven columns as a simplification to make the drawing more manageable; a typical actual array would be sixteen by sixteen, or perhaps twenty-four by twenty-four. These forty-nine photo sensors receive an image reflected from the work surface being navigated upon (not shown), typically through the action of an illumination and lens system (also not shown). In the depiction 1 of FIG. 1 a non-illuminated photo sensor, such as 5, is denoted by an empty square, as indicated by the legend 3. A filled in box, such as in legend 4, denotes a photo sensor that is illuminated (e.g., the photo sensor 6 at position (d, w)).

In FIG. 1 the photo sensors of array 2 are depicted as disjoint. This is in fact the case, although the active sensor area still accounts for about ninety percent of the foot print of the array. Some space between the sensors is needed to produce electrical isolation, and some is needed for interconnecting conductors and buffer amplifiers, etc. In the explanations that follow, we shall ignore the spatial gaps between the sensors by treating those gaps as if they were of zero extent, although still expecting electrical isolation. This will be a convenient fiction that will do no actual harm, but that will provide a welcome simplification by avoiding a messy minor complication.

What is depicted in FIG. 1, then, is a highly contrived (but nevertheless useful) case where just one pixel 6 (at location (d, w)) is illuminated; all the others are dark. That is, we assume that the work surface being navigated upon (by an unshown optical mouse) has one reflective feature that is aligned to impinge upon the center of array 2, and that the feature is of such a size that its image is projected exactly onto photo sensor 6 at (d, w) and onto no other photo sensor. Furthermore, the photo sensors are not mere switches, and produce variable outputs based upon the amount of light that reaches them. Let us assume that photo sensor 6 is sufficiently illuminated to produce a maximum output of one hundred on a scale of zero to one hundred, and that all the other sensors have outputs of zero. For now, let's just say that these values are expressed in some "photo units" related to the light within the image. Now let the optical mouse be stationary for some length of time (so the predicted movement is zero, and can thus be ignored), and let us inquire what outcome is produced by the correlation process.

As set out above, motion detection through correlation involves the making of nine (or perhaps more, but nine is typical) comparisons between those (corresponding nine) shifted trial reference frame positions and the sample frame, with the idea being that at one of those shifted trial positions the comparison between frames (images) will match better than at any of the others. To reiterate, the nine positions are: no change (i.e., use the predicted offset unaltered—and in our example that prediction is zero); one pixel up (i.e., augment the prediction by one pixel in the Y axis); one pixel up and one to the left; one up and one to the right; one to the left; one to the right; one down; one down and one to the left; and, one down and one to the right.

Refer now to FIG. 2, and note the array 8 of elements CS1 through CS9. The "CS" stands for Correlation Surface, and the suffixes "1" through "9" identify the results obtained from each of the nine comparisons (individual correlations) performed for the corresponding nine trial shifts. The array 8 is, of course, just a collection of values stored in memory, and the way we have depicted it was chosen to be suggestive of the use to which we are going to put it. Each of the nine elements of array 8 is an indication of how well a corresponding trial shifted reference image correlated with the sample image. So, for example, CS7 might correspond to the "one pixel to the left and one down" trial shift. The exact correspondence is, of course, arbitrary, so long as it is fixed. In our example, CS5 definitely corresponds to the null shift.

We must now address (one) the notion of correlation itself, to better understand how a degree of similarity can be found for a sample frame and an associated trial shift of a reference frame, and (two) the actual strategy for navigation based on such correlations. Navigation is clearly not as simple as saying that any particular correlation reveals identical frames. The two extreme cases of both the sample frame and each of the shifted reference frames being either all dark or all fully illuminated illustrate the point. In each case the agreement is total, but neither can serve as the basis for navigation, since none contains any distinguishable elements. The field of view (in this case, the seven by seven array 2 of photo sensors in FIG. 1) has to be big enough to include some image feature that manifests itself as a change in the level of illumination reaching the photo sensors. In general, the more such image features, the better, provided that the features themselves do not become so small that several begin to map onto each sensor. If that happens their effects are averaged over the area of each sensor, and if those small features are uniformly distributed over the work surface the outputs of all sensors begin to approach some uniform value, just as in the all light or all dark cases. (Of course, it might be the case that the small features are clustered, and that this manifests itself as corresponding variations in the photo sensor outputs. In that case we are saved, and can still navigate.)

In earliest prior art systems of the sort we are considering, the method for assessing the degree of correlation at each trial shift (i.e., the values of CS1 through CS9) involves the accumulation (over the different pixel positions within a frame) of the squared differences (between the reference and sample frame) of the digitized pixel values (the "photo units"). That is, for the photo unit value at pixel location (i, j) in the sample frame, we locate the photo unit value for pixel location (i+1, j) in the reference frame, find the difference and square it. We do this for all combinations of i and j for which there is such a pixel location pair in each frame, and for each such squared difference we add that to an accumulation thereof. The correlation value for a different trial shift is produced by different arithmetic on the subscripts. So, if (i+1, j) represents shifting "one to the left" then (i+1, j+1) might represent the trial shift "one to the left and one up" while (i+1, j−1) represents the trial shift "one to the left and one down." Prediction is simply a further alteration of these incremented and decremented subscripts. All this amounts to quite a bit of arithmetic, but provides a very reliable result. It requires that the navigation chip include an extensive amount of arithmetic circuitry connected to the stored data within the reference and sample frames in order to produce the nine correlation surface values CS1 through CS9 in a timely fashion.

In later prior art systems the spatial filtering performed on the images to mitigate the effects of grain is further used to reduce the amount of resolution used to represent the filtered versions of the reference and sample images. This is done by the simple expedient of taking the sign of the filtered output for each pixel location. Once this is done the correlation process becomes one of simply counting the number of differences between pixel locations. Locations are accessed one at a time, and the results of accessing a filtered reference location and then a corresponding filtered sample location are latched and applied to an XOR (Exclusive OR) gate. The output of the XOR gate replaces the squared difference. As further shifting is performed the XOR gate may or may not indicate a difference. Each time there is a difference the output of the XOR is present, and that signal is used to increment a counter. The final value of that counter takes the place of the accumulation in the squared difference case.

With continued reference to FIG. 2, then, the result is nine individual correlation numbers that we may arrange as a Correlation Surface Array 8 corresponding to the different trial shifts used to find them. The effect is to describe a Correlation Surface 9, which, under favorable circumstances, has certain properties. (Correlation Surface 9 is an abstraction that is "shown" only for clarity, and does not exist as a separate entity. What does exist is collection of nine values in the Correlation Surface array 8.) Say, for example, that the work surface we are navigating upon is free of grain or any other poisonous artifacts, that mouse velocity is uniform and well within limits, and that everything is generally operating as it should. We then expect that the last prediction would be correct, and that the peak of the Correlation Surface would be at the center cell of the nine, with the remaining eight cells all having values indicating substantially lesser amounts of correlation. (In the figure, "UP" or "ΣΔ<<" is in the direction of smaller numerical values [smaller differences, meaning greater correlation], while "DOWN" or "ΣΔ>>" is in the direction of larger numbers [bigger differences, implying less correlation]). This is the kind of situation depicted in the view 7 of FIG. 2, where the array 8 of nine individual correlation values (CS1 through CS9), if projected as being surface elevation, would produce a Correlation Surface 9 having a pronounced central peak 10. Some writers on the subject have viewed the Correlation Surface from "underneath" as opposed to "from above" as we are doing here. When viewed from below a well formed Correlation Surface resembles a "bowl" and is sometimes so called. Borrowing from the lexicon of computer graphics, we may say that the Correlation Surface 9 is composed of a number of patches.

FIG. 2 clearly also represents what we would get in the example single-illuminated-pixel case (FIG. 1) we set out above, where the velocity is zero and the mouse has been at rest for some period of time. However, we should point out that the reliability of the techniques of navigating based on a Correlation Surface depends upon its possession of certain properties. For example, it should not be flat or be saddle shaped. Flatness is subject to some definition and interpretation that we need not delve deeply into here. However, we can point out that the size of a peak is strongly influenced by the number of pixels that are associated with features that contribute to correlation. In our simple example, there is but one illuminated pixel (6 in FIG. 1). This means that only its photo value contributes to the summation within the correlation values. Since all the other photo values are zero, this means that the value for CS5 in FIG. 2 is close to the other eight (CS1–4 and CS6–9), compared to what it would otherwise be if there were many features that correlated. That is, if there are many features, then in the zero velocity (or correct prediction) case the non-null trial shifts will not correlate and will have associated with them large differences, producing a large accumulation thereof, while the null shift has only a little or no difference. The result would be a much larger peak 11 that has more immunity to noise, quantization error, etc. Nevertheless, we shall find the single illuminated pixel example useful anyway, and somewhat easier to follow. In principle it is valid, and if needed, we could assume the system is ideal with respect to noise (there is none) and quantization error (ditto).

Now suppose that there was a constant velocity, such that the intervening movement was exactly an integral number of pixel positions in X and or Y, with each amount within the range of prediction. The same sort of correlation surface would result.

To continue, then, we note that an actual array of photo detectors would be, say, sixteen by sixteen. That is large enough to allow the prediction process some "room" to operate in, as well as to allow noise based variations in pixel values to average out, raising our confidence in the obtained results. That said, we shall continue with a simplified example of a seven by seven array, as in FIG. 1.

As a convenient point of departure, let us say that there has lately been no motion at all, and that the system is "caught up" so that the reference and sample frames correlate quite well with a predictive offset of zero. The single photo sensor 6 at location (d, w) is fully illuminated, while all the others are perfectly dark. Under these favorable circumstances the Correlation Surface will resemble the one (9) shown in FIG. 2. That is, there will be a (small but well defined) central peak 10 in the center of the Correlation Surface 9, symmetrically surrounded by values that represent lower amounts of correlation.

Now suppose that between samples there is a movement by exactly one pixel in the X axis, such that the situation at the array 2 of photo sensors is as shown in the depiction 12 of FIG. 3. Note that the pixel 6 at location (d, w) is now not illuminated, while its neighbor 13 at location (e, w) is illuminated. Whether this is the result of abrupt physical motion between samples, or of suitable continuous motion, is not the issue. Since the system is a sampled one, all this appears as a discrete change, so that the navigation by correlation mechanism is abruptly faced with a new situation.

Refer now to FIG. 4, wherein the depiction 14 represents the outcome of a new round of trial shifts for the new sample frame represented by FIG. 3, but where the reference frame is represented by FIG. 1. It is easy to appreciate that the correlation circumstances depicted in FIG. 4, where peak 17 has shifted one pixel in X (from CS5 to CS6), and where all the other eight patches in the Correlation Surface 16 remain flat, indicates motion of exactly one pixel in X. We would probably continue in that assertion in the case where the other eight correlation values varied in value "slightly," provided (contrary to the assumption of this particular example) that peak 17 were quite large compared to the other eight values and their variations. In any event, if the navigation system were being asked to output indications of motion with resolution limited to amounts of displacement over the work surface corresponding (through any magnification caused by lenses in the optical path) to the sensor-to-sensor distance, then we would take a FIG. 4-like situation as an indication of just such an amount of movement, even if there were some "rattle" in the values of those other eight patches in the Correlation Surface 16. But to do that is to throw away much useful information that conveys considerable extra resolution.

Refer now to FIG. 5, wherein is shown (arranged vertically on the left side of the figure) a series 24 of illumination circumstances (18–22) for the sensors 6 and 13, at locations (d, w) and (e, w), respectively. These appear at six different times, $t_0$ through $t_5$. At $t_0$ the situation is as it is in FIGS. 1 and 2, while at $t_5$ it is as in FIGS. 3 and 4. At the between times of $t_1$ through $t_4$, the amount of illumination on the sensors 6 and 13 is divided according to an intervening amount of motion in the X axis. We have chosen to show shifts in illumination of about twenty percent of the total. Samples are taken, and a new shift-and-correlate procedure performed as each time $t_0$ through $t_6$. Shown in correspondence with each sensor illumination circumstance (and on the right side of the figure) is a resulting (partial) correlation outcome. We say "partial" since not all nine patches of the Correlation Surface are shown, only the middle cross section along the direction of the X axis (CS4, CS5 and CS6).

It will be noted that the cross sections of the Correlation Surface varies in height (as between CS5 and CS6) in correspondence with the way the illumination shifts from the sensor 6 at location (d, w) to the sensor 13 at location (e, w). (Note that the variation is proportional to the square of the difference between the reference and the sample for correlation according to the earliest prior art, and proportional to just the number of differing pixels for correlation according to the more recent prior art.) In this case the reference may be thought of as a solid box (fully illuminated sensor) for location (d, w), and as an empty box (non-illuminated sensor) for location (e, w). If a fully illuminated sensor outputs one hundred photo units, then the maximum difference squared is $10^4$ photo units (or a mere one for the single bit resolution case), which is the abscissa for the right hand portion of the figure.

It is clear from the illustrations in FIG. 5 that it ought to be possible to analyze (by interpolation) the change in shape of the Correlation Surface cross section and extract the information that, at $t_1$ the position in X had changed twenty percent of the way from (d, w) to (e, w), and sixty percent at $t_3$, etc. Indeed, it is possible, although it is not quite so simple as we have made it seem with this example. To be sure, interpolation of the sort we need is indeed well defined and practiced in the prior art. But there are numerous complications, as we shall now point out. Here now, and in no particular order, are some of the complicating circumstances that interpolation must accommodate.

The example of FIG. 5 shows nice changes in cross section heights because we assumed that we would have a fair degree of resolution available for measuring the amounts of sensor illumination. To carry ten, eight or even six bits of resolution for the "photo units" all the way through the computations requires very extensive arithmetic circuitry. Our example involves only one part out of one hundred, which would require eight bits ($2^8$=128).

The way the example of FIG. 5 is presented may make it appear that at least medium resolution of sensor illumination is required: how else to recognize an eighty-twenty split of illumination between two adjacent sensors? However, if we are realistic about the number of light and dark pixels that are apt to be in a frame, we can still get sub-pixel resolution of motion from very low resolution of pixel intensity (one bit) through averaging, provided that there are in the image enough pixels with which to work. Indeed, an unknown and variable number of features will typically be involved in the correlations, and the number of pixels involved is usually more than is needed for useful sub-pixel resolution. However, we don't know in advance how many there are, nor anything about the amount or distribution of illumination. The manner in which features disappear from the field of view, while new ones appear (if they do), is wholly unpredictable. The cozy property of the amount of light reaching the sensors at locations (d, w) and (e, w) forming a constant sum that is suggested by FIG. 5 is instead quite contrived. Movement in off-axis directions need not obey that rule, and it certainly is not obeyed for a large image of many features.

It would be rash to assume that a one pixel shift in any direction would cause any particular change in the amount of correlation. In our example it causes a maximal amount, but that circumstance is contrived. In general, we won't know in advance what the distance from the "floor" to the "top" of the correlation surface will be.

While on the subject of amplitudes for the various patches of the Correlation Surface, it will be recalled that the earlier prior art manner of finding a correlation amplitude for a trial shift involves squaring a difference. This has the beneficial property that it both rectifies (it does not matter which of the differing items was the larger) and accentuates greater differences more that small ones. But that has a pronounced effect on interpolation. That is, interpolation is, say, a function I of three input variables: I(CS4, CS5, CS6). I returns the percentage to be added or subtracted from the location corresponding to CS5. If there is a mapping, and clearly there is, from circumstances on the left side of FIG. 5 (illumination circumstances) to the right side (correlation circumstances), then it is clear that I must include the inverse of that mapping. But now we are saying that the earlier prior art mapping involved a squaring operation, so we must not be surprised if the corresponding interpolation rule I includes operations that accomplish the inverse of that. For that earlier prior art such was indeed the case, and although it would seem that for the reduced precision (one bit) later prior art a different interpolation function would be in order, the same interpolation mechanism was still employed. It seems that it provides nearly the right answer anyway, and so was left unchanged.

Thus, the prior art dealt with these complications, and especially with that arising from the squaring, by fitting a family of curves to cross sections of the Correlation Surface, one hypothetical member of which is shown in FIG. 6. Referring now to the graph 25 FIG. 6, note the stair step graph 27, which is amerged composite of the amplitudes of Correlation Surface cross sections similar to shown on the right hand portion of FIG. 5. Curve 26 is a smooth curve that has been fitted to the step-wise waveform 27. Both waveforms have a somewhat "bell curve" shape. The central peak in the middle represents increased correlation. As mentioned in connection with Correlation Surface patch 11 in connection with FIG. 2, the height of the peak depends upon how many pixels are involved. The central portion 28 of fitted smooth curve 26 is parabolic, and is the region over which interpolation can readily be performed. The outlying skirts 29 and 30 are transition regions from strong correlation to what one might expect from correlation performed upon random pixels, which is not the same as strong "anti-correlation" (every compared pixel pair produces a sizeable difference). To be sure, some assumptions (guided by test data obtained from typical work surfaces, such as desk tops, various papers for office use, etc.) concerning a given pixel size (photo sensor dependent) and an average feature size go into producing the curve 26. It turns out that the peaked portion 28 of curve 26 is essentially parabolic.

Curve 26 is said to be a member of a family of similar curves, of which we have shown only one. There is a family, since the height of the peak can vary over time, and also since its width between the locations of transition to regions 29 and 30 can vary. Which member of the family is of interest at any given time is selected by the heights of the Correlation Surface cross section for the dimension within which we are going to interpolate. That gives us three points (the circled A, B and C) along a parabola, which is sufficient to define it. The three points have an abscissa of pixel displacement, and those values will be minus one, zero and plus one. The corresponding ordinates will the value of the cross section at those displacements.

Now, if one uses those three points from a Correlation Surface cross section for which there has been some movement and an aim to perform interpolation, those points will describe some parabolic segment, whose upper section 31 has been selected as an example. It has a peak that is (in this example) one half pixel (32) in the "to the right direction" away from the null shift. To actually find what this value is we solve the equation of that family member for its root. Thus, we add a half pixel's worth of distance to the predicted motion.

We thus have parabolic $I_x$(CS4, CS5, CS6) and $I_y$(CS2, CS5, CS8). $I_x$ and $I_y$ may well be the same functions. This works fairly well, but the creation of such a "squared" Correlation Surface requires quite a lot of arithmetic circuitry if done in hardware, and presents a performance problem if performed in software by an onboard processor.

Refer now to FIG. 7, wherein is shown a generalized and quite simplified block diagram 33 of an optical navigation system of the later prior art sort that is of interest. An LED 35, which may be either an infrared (IR) or visible light LED illuminates with light 36 a work surface 34 that is to be navigated upon, perhaps by a mouse (whose surrounding structure is not shown). There are expected to be some imageable micro-features on the work surface 34, either as a result of variations in composition, albedo or highlights and shadows caused by micro-texture. The light 37 reflected from those micro-features is coupled by lens or image coupling system 38 (e.g., suitable dense fibre optic bundle, prism, mirror, etc.) as light 39 directed to impinge upon an array 40 of photo sensors. In a preferred embodiment the array 40 is sixteen elements on a side. Electrical conductors 41 allow electrical signals that represent the degree of illumination for each individual sensor to be measured. To this end, they are coupled to a scanner 42 (a switching mechanism), which allows the individual sensors' outputs to be applied, one at a time, to an ADC 43 (Analog to Digital Converter).

The six-bit output 44 of the ADC 43 is applied to a Spatial Filter 45, which includes FIFO's 46 (First In First Out) that temporarily buffer the data coming from the ADC 43. The outputs of the FIFO's 46 are coupled to various arithmetic circuits that perform the calculations accomplishing the spatial filtering. This is all performed "on the fly," as it were, as elements of the photo sensor array 40 are automatically scanned in a definite order. With the arrangement there is no intermediate storage of a complete (raw) Reference Frame or complete (raw) Sample Frame. A Filter Controller 48 controls this spatial filtering process in response to instructions received from a Micro Controller 60 that will be described in due course. Thus, the Micro Controller 60 sends instructions to the Filter Controller 48 pertaining to the process of spatially filtering the reference and sample images to produce the Filtered Reference Image Array 50 and the Filtered Sample Image Array 51. This filtering involves expanding the image at its borders to minimize transients at the start of the filtering process, and then computing a value for each interior (non-border) pixel location that is based on the values of the surrounding pixels. The "filter" itself is simply that process, in conjunction with a selected particular computational rule. Where the filter is to mitigate the evil effects of grain in the work surface the computational rule emphasizes irregular differences while suppressing regularity having a period of every other pixel. See the incorporated IMAGE FILTERS AND SOURCE OF ILLUMINATION FOR OPTICAL NAVIGATION UPON ARBITRARY SURFACES ARE SELECTED ACCORDING TO ANALYSIS OF CORRELATION DURING NAVIGATION for a detailed explanation of how this filtering is performed.

In operation then, ADC 43 digitizes each photo sensor's value to six bits. The digitized values for a frame will either be for an initial Reference Frame that is to be filtered on the fly and stored in a Filtered Reference Image Array 50, or for a Sample Frame that is to be filtered on the fly and stored in a Filtered Sample Image Array 51. After sufficient motion occurs a new Filtered Reference Image Array will be acquired. These activities proceed under the control and direction of the Micro Controller 60 in a known and conventional manner.

The native outcome from the filtering process is another multi-bit value, which could be maintained and used as the basis for further processing. It is preferred, however, that in a low cost screen pointer control application (think: "mouse" or fingertip tracker) the output of the filter be limited to the signs of the values computed.

Micro Controller 60 mentioned above is a small microprocessor, and although we choose to create our own, there are suitable merchant designs that could be used, instead. The Micro Controller 60 interacts with other items through an Address & Data Bus 57, which we depict as having eight bits for addressing and for data. (This is merely illustrative. A single set of bus conductors can be multiplexed in a conventional and well known manner to send and receive addresses and data separated in time, or first and second halves of addresses, and then data, etc. Also, the bus can be wider to transmit both address and data at the same time.) In our illustrative and simplified example of FIG. 7, the various other system elements are coupled to the Address & Data Bus 57 and are accessed by a well known technique called "memory mapped I/O" where different items that are not memory have different addresses, and variously respond to sent bit patterns as either instructions or as data, according to a format or protocol used by the system. In this scheme, the processor does not have separate I/O channels for the control of "peripherals," but treats peripherals and memory alike as simply things to be addressed, written to and read from. Some addresses are not really memory, however, while other are. The ones that are not do useful things when they are written to in an appropriate way (instructions are sent to them), and can be read from to provide to the Micro Controller data that has been captured or computed (e.g., data located in the Filtered Image R/W Memory 49) or that is to be manipulated (as will be the case with data from the Correlator 53).

Note the Bus's I/O conventions for input, output and bidirectional traffic, as indicated by stylized arrows 66, 65 and 67, respectively.

A System ROM (Read Only Memory) 61 is coupled by a separate Instruction Bus 68 to the Micro Controller 68, and provides the executable code that determines the activities of the Micro Controller 60. Included in this code are all the firmware routines for the algorithms of operation and data manipulation that are performed or controlled by the Micro Controller 60. We shall have more to say about improvements to certain of these routines in due course.

To continue, then, a System R/W (Read/Write) Memory 58 is also coupled to the Address & Data Bus 57. It is here that the Correlation Array 59 is stored. It is derived from shift and compare operations performed on the Filtered Reference Image Array 50 and Filtered Sample Image array 52. There is also a remainder of memory 69 that is used for miscellaneous purposes that outside the scope of this disclosure.

Computed results representing movement that has been detected are applied as output data to interface 59, whereupon it appears as Motion Data to Using Device (60).

Save for the LED 35 and the lens element 73, all of the stuff shown in FIG. 7 can be part of a single integrated circuit.

In the example system shown in FIG. 7 the filtered image arrays 50 and 51 are kept in a Filtered Image R/W Memory 49 that includes a Filtered Array Controller 52 coupled to the Address & Data Bus 57. These arrays are addressable at the bit level, and allow a "dual port" type of operation that permits data from the Spatial Filter 45 to be written, while being interleaved in an as needed fashion with read operations to send filtered data to the Correlator 53.

Finally, we come to the Correlator 53, which includes an XOR gate 54 coupled through latches 70 and 71 to the read outputs of the filtered image arrays 50 and 51. The output of the XOR gate 54 is coupled to the increment input of a counter 55, that can also be reset at the start of an accumulation of differences for a new trial shift, and that is enabled to count each time there is a new pair of pixel locations to be compared. The n-bit count 64 from the counter is made available to the Micro Controller via the Address & Data Bus 57 and a Correlator Controller 56, that latter of which also manages the overall operation of the Correlator in response to instructions from the Micro Controller 60.

The Correlation Array 59 is created from a comparison between the Filtered Sample Image Array 51 and the various shifted version of the Filtered Reference Image Array 50. The shifting manifests itself as offsets at the address level for the addressable bits in the Filtered Image R/W Memory 49, and includes the offsets that predict the amount of intervening motion. The trial shifts are automatically generated and added in as further offsets. The actual comparison between the individual elements of the arrays is performed upon the latched outputs by the XOR gate 54. For each dissimilar pixel pair the counter 55 is incremented.

This (simplified) later prior art correlation process accumulates the number of dissimilarities between array elements for each of the nine trial shifts. The number that results indicates degree of correlation at that shift. The maximum sum that can occur is limited by frame size, and further by the lack of frame boundary overlap caused by shifting and by prediction. As an example, with a prediction of zero, for the null shift there could never be more than two hundred fifty-six differences, since that is how many elements there are in an array. But for each of the shifts there is lost either a column of sixteen, a row of sixteen, or both. (If both, then there is an overlapping comer in the removed pixel locations, but that location can only be removed once, so the net loss is thirty-one pixels, not thirty-two.) So, other maximums are two hundred forty and two hundred and twenty-five. (These are total worst case disasters for correlation, of course, since they represent a difference at every array element position—something that is very contrived. They are nevertheless illustrative.) Prediction operates in a similar manner to "permanently" remove rows and columns from potential overlap even before the shifting.

Once the Correlation Array 59 has been created it can be inspected to discover where the peak is (or otherwise), which indicates the general direction(s) of one pixel's worth of motion. Interpolation provides a refinement of that indication, and an improved manner of interpolation for a system such as that shown in FIG. 7 will be discussed in connection with FIG. 8.

Simplicity is most desirable in an optical navigation circuit for a mouse or other hand or finger operated screen pointer control device that places a premium on low cost over absolute accuracy (the operator servos his hand or finger until the pointer is where he wants it, despite any irregularities in tracking). This has led to arrangements where navigation is performed with a (filtered or compared) "photo value" of as few as one bit per pixel. That one bit might represent either: (a) whether or not the light reaching the sensor is above or below some threshold amount that may be determined dynamically as a function of illumination conditions and image properties; or (b) that the pixel is on the edge of a feature, as determined by a filter. When measures as drastic as these are taken to reduce the size and complexity of the navigation hardware, it is clear that it is also appropriate to look for corresponding reductions in the complexity of the correlation process that further reduce cost (primarily driven by chip size) without sacrificing needed performance. Hence, the counting of XOR outputs in place of the summation of squared differences. Changes to the correlation mechanism can have an effect on the process of interpolation, as well.

So, the question is, given that we are intent upon operating with reference and sample frames that are of reduced resolution (say, to a single bit), what can be done to correspondingly reduce the size and complexity of the interpolation mechanism, without sacrificing the needed level of performance for a screen pointer control device, such as a mouse?

SUMMARY OF THE INVENTION

Interpolation along an axis is performed on a Correlation Surface Array that was created from counting the instances of difference (XOR) between corresponding pixels of single bit resolution images having trial displacements. The interpolation is performed by finding the intersection of two straight line segments that are identified by the shape of the cross section of the Correlation Surface along the axis of interest. In the case of nine trial shifts there are three values in such a cross section, and they may be seen as representing three points whose abscissas are the pixel shift amounts minus one, no shift, and plus one, and whose ordinates are the corresponding correlation values. In situations where navigation (and interpolation) is possible, these three points will have certain properties. The ususal case is that two of the points determine one line having a slope m, and the other point determines the other line (assumed to have slope -m). The three points may also lie along the same line, although this represents an exceptional case that may be handled differently. The three points might also describe other conditions that are associated with Correlation Surfaces that are not suitable for navigation, and these are ignored. In the usual case the point of intersection for the two lines is found and its abscissa is the interpolated value for motion along the axis of interest.

DESCRIPTION OF A PREFERRED EMBODIMENT

Figure 7:
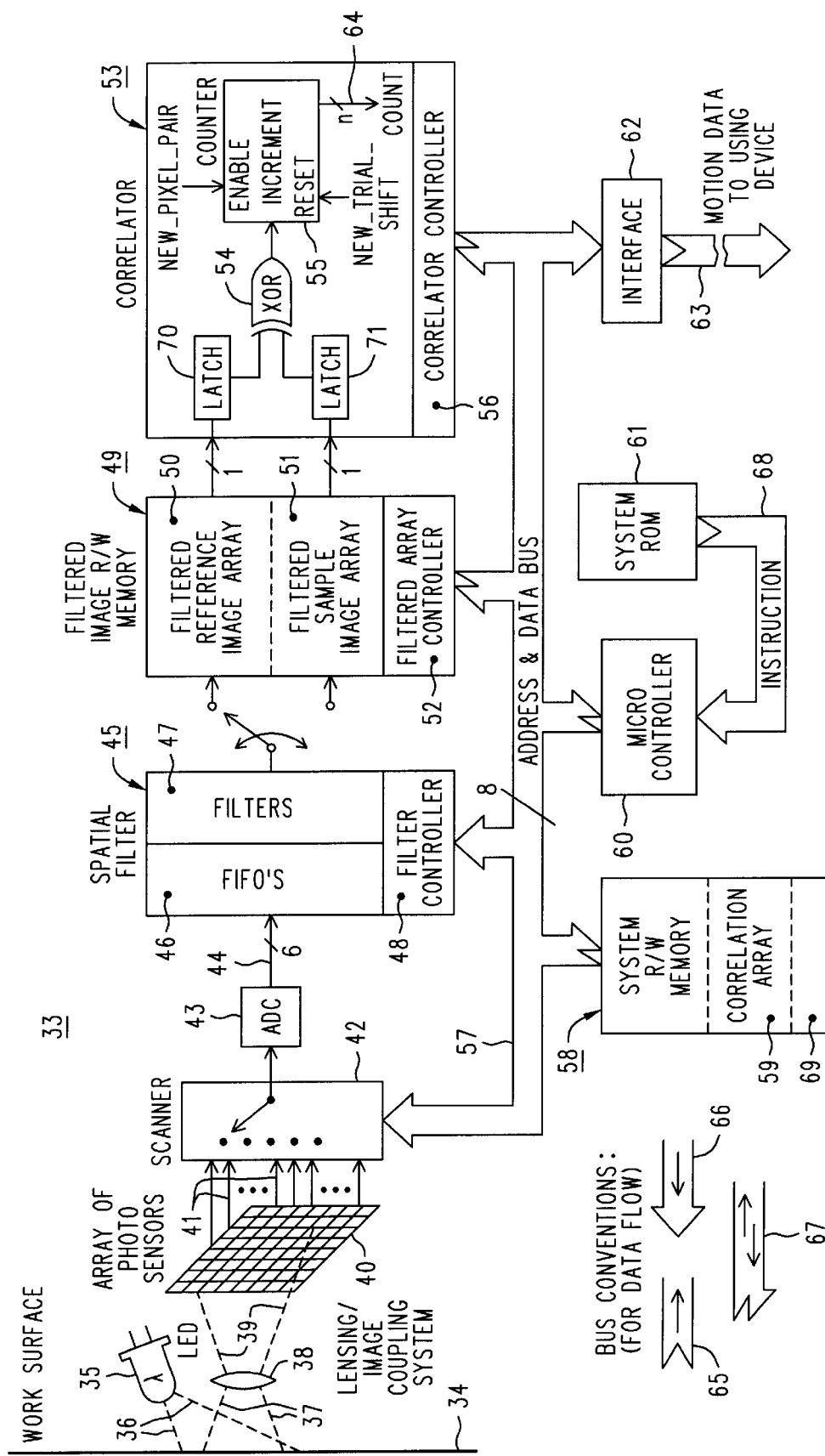
FIG. 7 is a simplified block diagram of an optical navigation system of interest and that contains simplified correlation and interpolation mechanisms.
Figure 8:
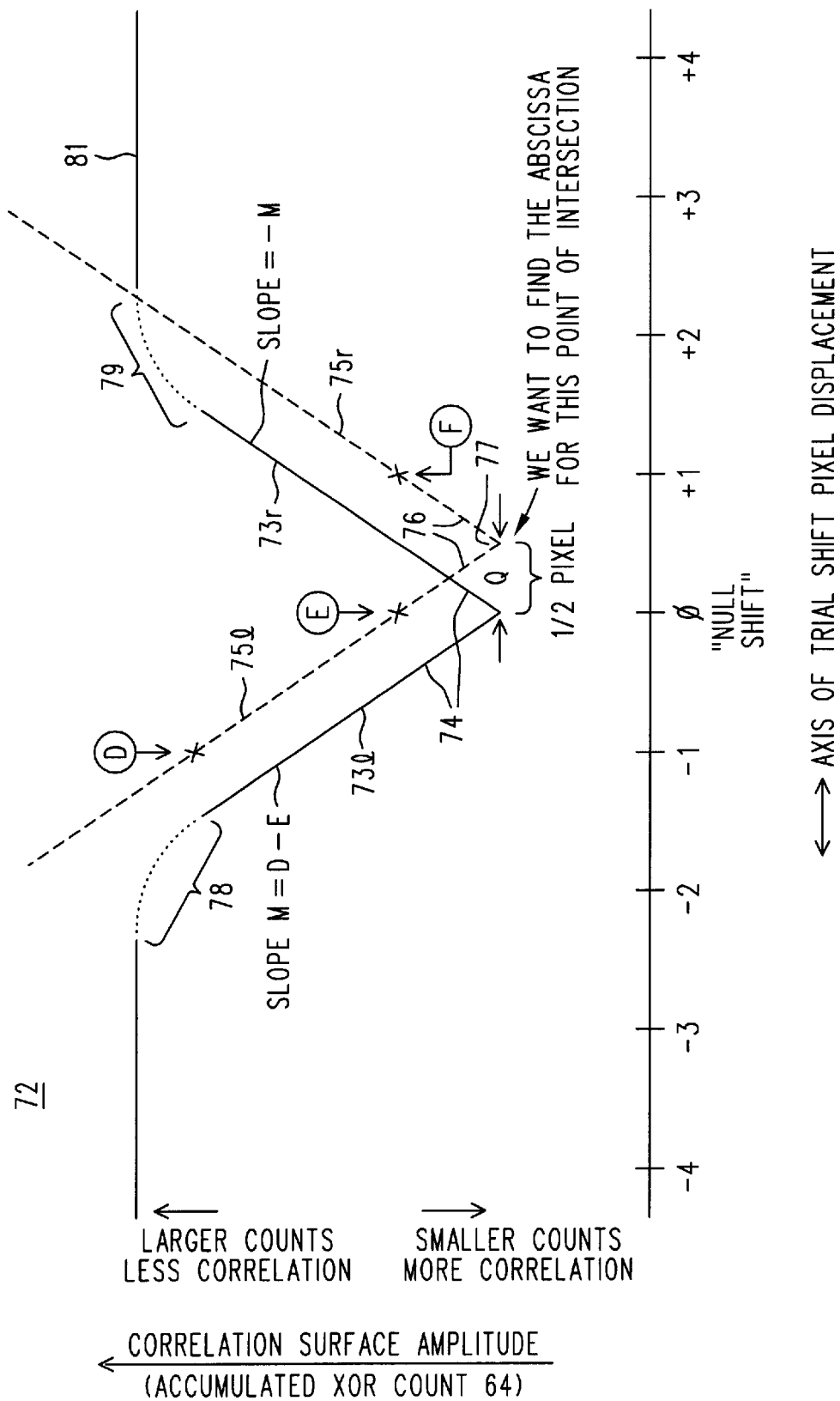
FIG. 8 is an illustrative graph of simplified interpolation for an optical navigation system of interest.

With reference now to the graph 72 of FIG. 8, we consider interpolation along one axis; the procedure to be described is repeated for the other axis. The ordinate in FIG. 8 is the number of counts 64 from XOR gate 54 as counted by counter 55 in Correlator 53 of FIG. 7. Our illustration is thus of a bowl, rather than of a peaked Correlation Surface. This is merely a minor change, and amounts to simply turning the graph upside down. It does better match what goes on in the hardware, however.

Figure 1:
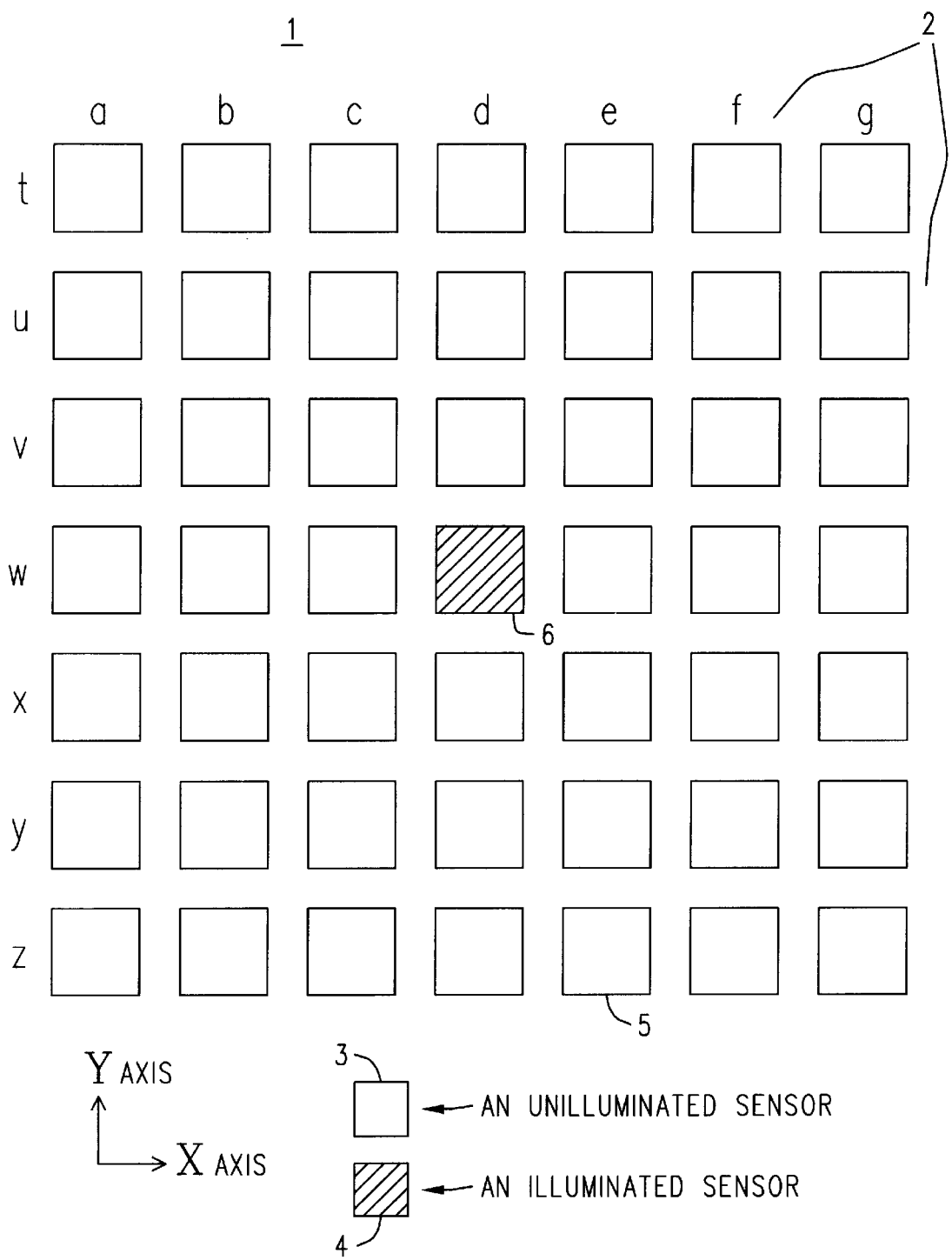
FIG. 1 is an illustration of a simplified image impinging upon an array of photo sensors of reduced extent in an optical navigation system.
Figure 2:
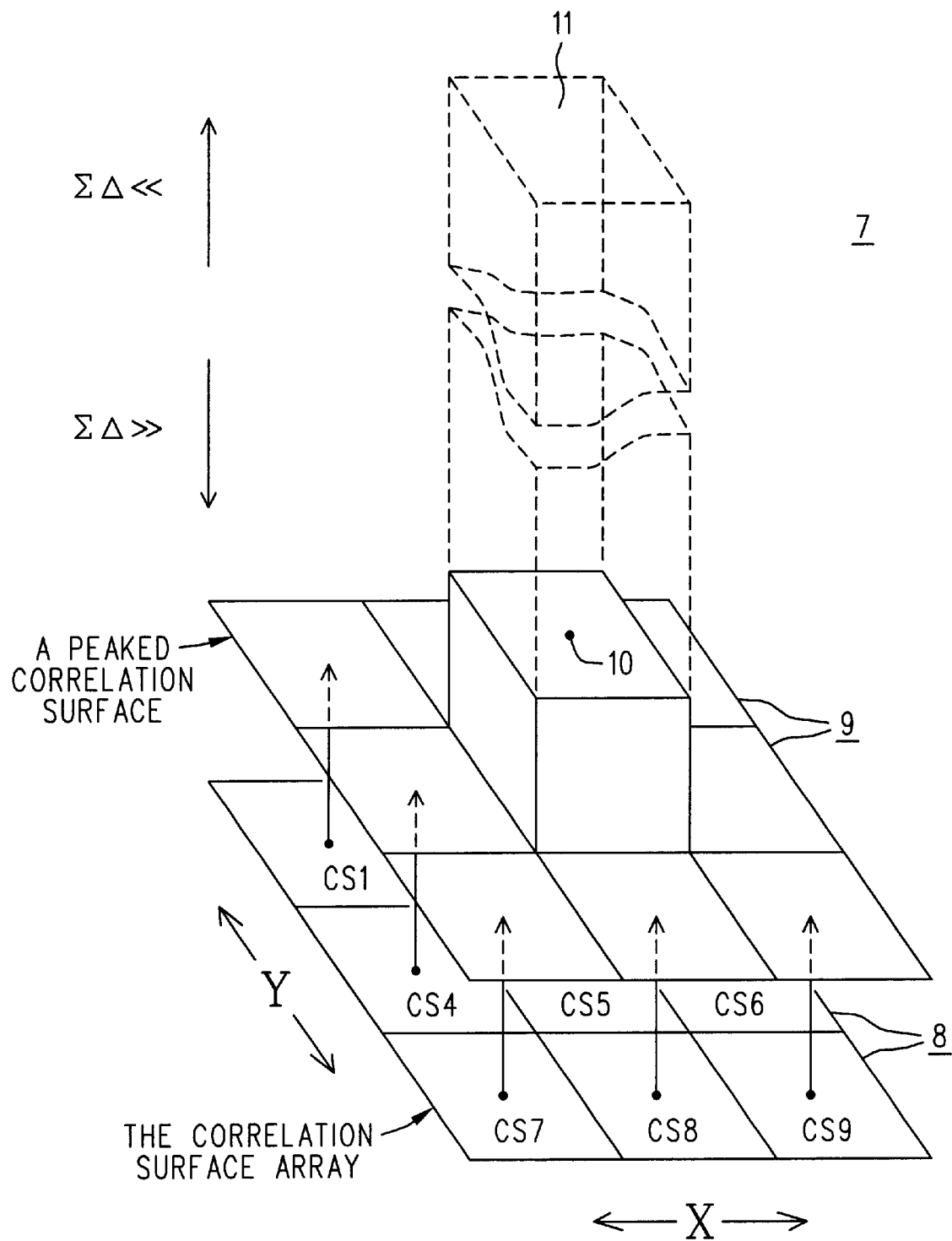
FIG. 2 is an illustration of a Correlation Surface Array and corresponding Correlation Surface for the image of FIG. 1.
Figure 3:
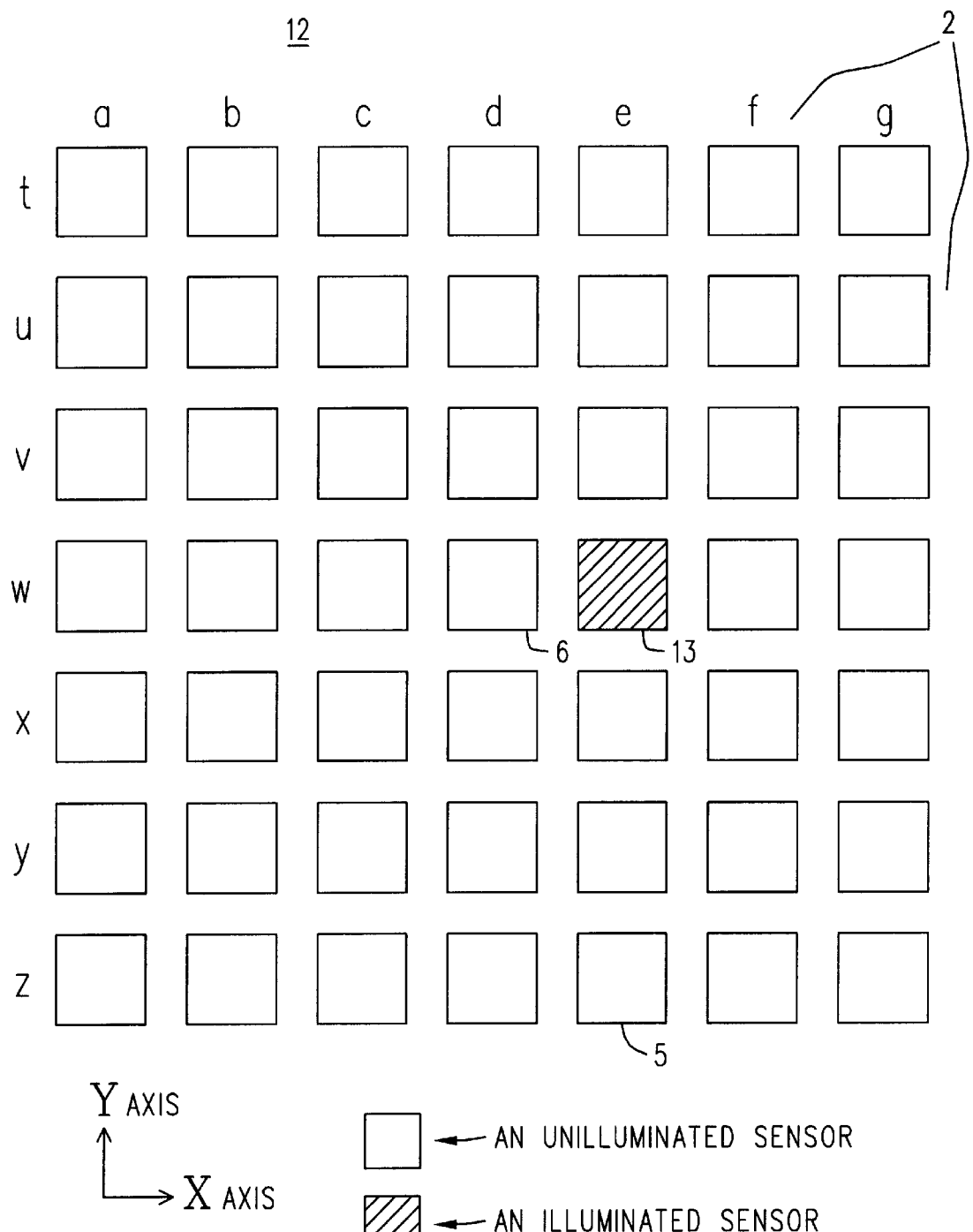
FIG. 3 is an illustration similar to FIG. 1, but with an image displacement of one pixel in the X direction.
Figure 4:
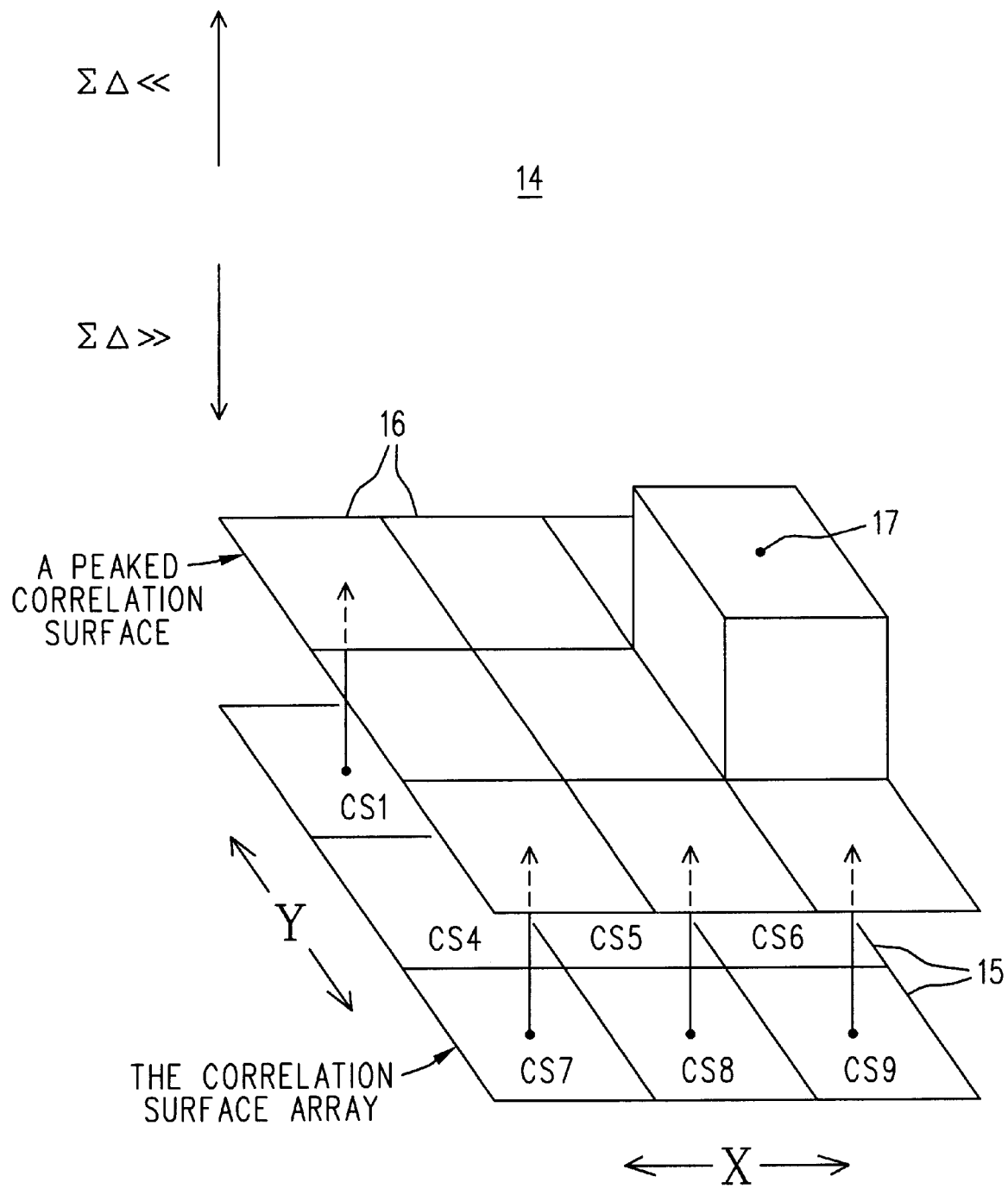
FIG. 4 is an illustration of a Correlation Surface Array and corresponding Correlation Surface for the image of FIG. 3.
Figure 5:
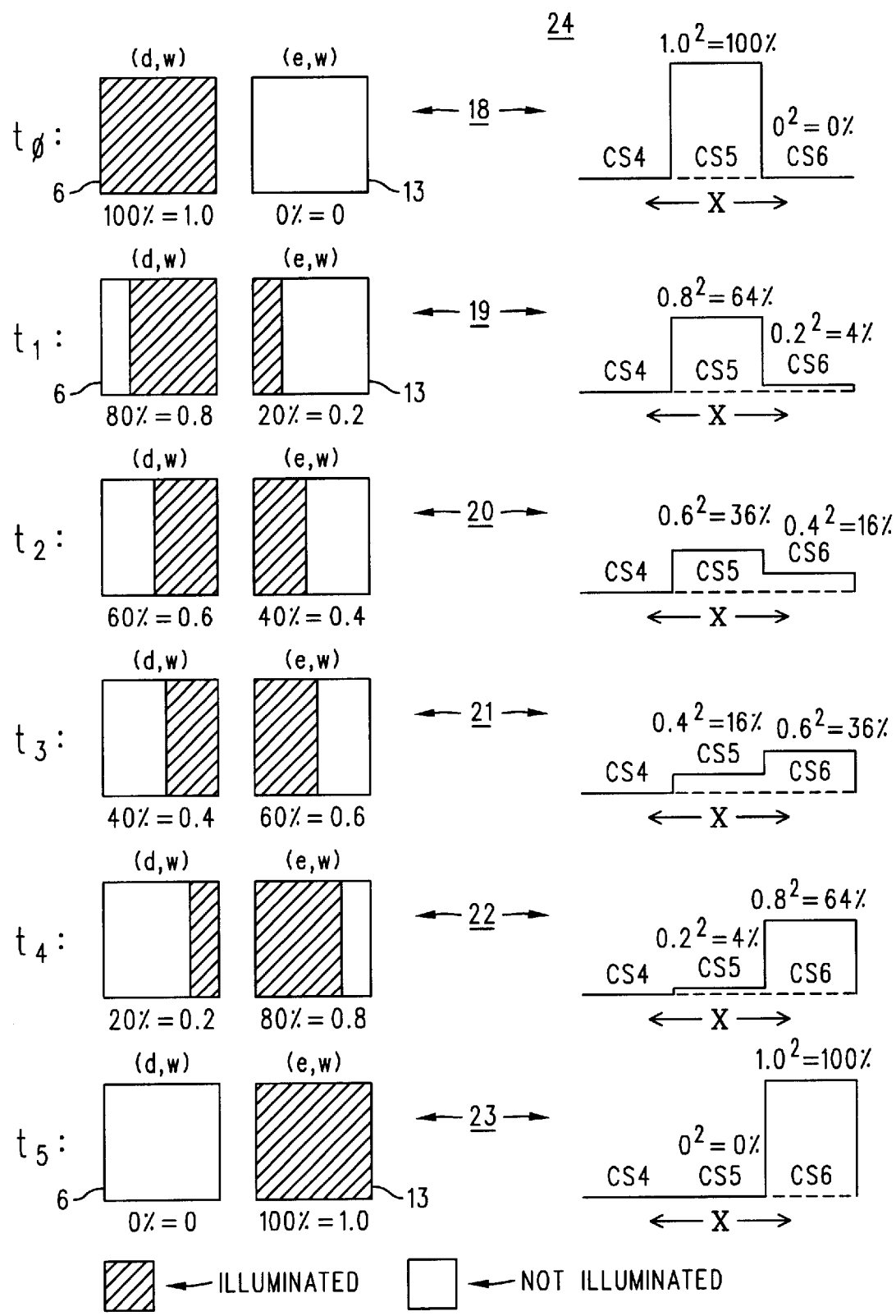
FIG. 5 is a collection of illustrated illumination circumstances starting with that of FIG. 1 and ending after five equal steps with that of FIG. 3, including illustrative cross sections of the corresponding resulting Correlation Surfaces.
Figure 6:
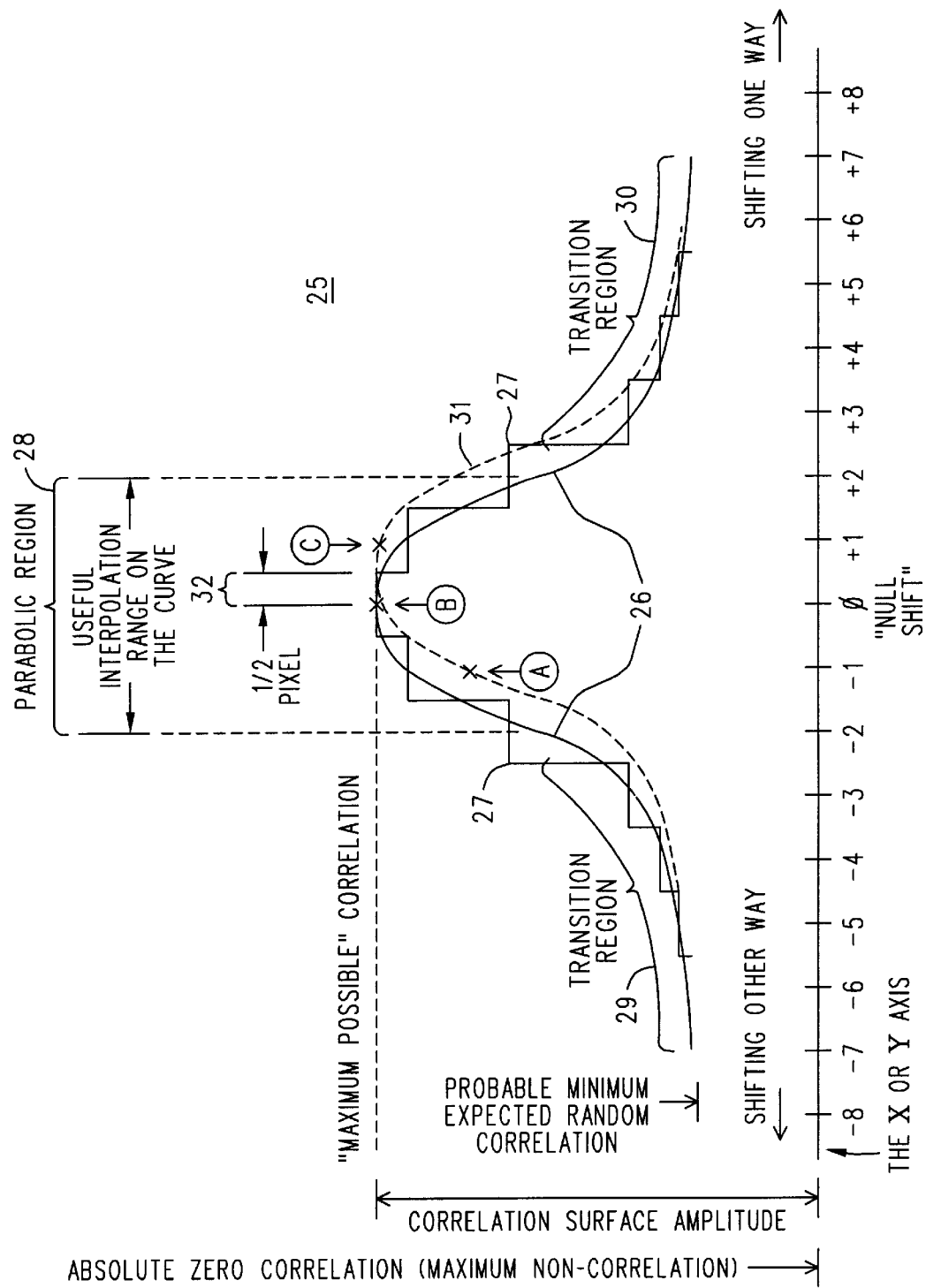
FIG. 6 is an illustrative graph of one member of a family of prior art interpolation functions useful in optical navigation of the sort under consideration.

In FIG. 8 the curve 74, composed of segments 73*l* and 73*r*, represents a linear curve fit to the changes in value of the Correlation Surface as motion occurs along one axis. As such, it corresponds to curve 26 of FIG. 6. As with FIG. 6, as the amount of motion increases to some value, transition regions 78 and 79 lead from curve 74 to segments 80 and 81, respectively. (We will never operate on those segments.) Dashed lines 75*l* and 75*r* represent a curve 76 similar to 74, but shifted over by the amount to be discovered through interpolation. We know things about lines 75*l* and 75*r* from examining the Correlation Array at the null shift and the two opposing offsets of minus one pixel and plus one pixel (along the axis of interest). What we get are the three values D, E and F, shown within circles in the figure. There are different cases that can occur, and FIG. 8 shows a typical one, where the points described by D and E both lie along the same line 75*l*, while the point described by F lies along a second line 75*r*. Points D and E are two points along a straight line. They uniquely define that line (75*l*), and determine its slope (m=E−D). We assume that lines 75*l* and 75*r* are a shifted version of curve 74, and that slope of the right-hand portion 75*r* has a slope of −m. Line 75*r* is uniquely determined by a slope of −m and passing through the point described by F. It is thus possible to find the intersection 77 of the two lines 75*l* and 75*r*. That point of intersection 77 has an abscissa Q, which is this particular example is one half pixel.

The other cases that can occur are that: The points described by E and F are on the same line segment, and that the point described by D is on the other; And, all three points described by D, E and F are along the same line. The first case is the mirror image of the one set out in the preceding paragraph, while the second is a limiting case of one full pixel's worth of interpolated value. The navigation system can recognize this latter case and deal with it successfully, but it is notable in that it should never happen if velocities stay within range and prediction operates as it is supposed to. Still, it is prudent to allow for that case, and handle it gracefully. There are yet other cases that can occur, but they involve unsatisfactory shapes of the correlation surface, and the system will not attempt to interpolate, since continued navigation will require some fundamental change in operational conditions.

The two mirror image cases (D and E together on the same line, versus E and F together) can be distinguished by determining which of D and F have the greatest count (least correlation). The one that does is the one that goes with E. This also determines if the interpolation amount is to be added or subtracted from the coarse motion determined by basic prediction and correlation. Now, it might also happen that D and F are equal. In one case where E is also much less than D and F this merely means that there has been no motion, and that the interpolated value will be zero. In other cases the shape of the Correlation Surface can be unsuitable for navigation. (For example, all three of D, E and F are essentially the same in value—often caused by lifting the mouse off the work surface so that the photo sensor array receives uniform illumination and no focused features.)

For the case set out in FIG. 8, it will be appreciated that the principles of algebra and analytic geometry provide the following solution for Q:

$$y=mx+b \qquad \text{Eq. (1)}$$

(slope—intercept form of an equation for a line)

$$m=(y-y1)/(x-x1) \qquad \text{Eq. (2)}$$

(point—slope form of an equation for a line)

$$y=(E-D)x+E \qquad \text{Eq. (3)}$$

(substituting into Eq. (1) for line 75*l*)

$$D-E=(y-F)/(x-1) \qquad \text{Eq. (4)}$$

(substituting into Eq. (2) for line 75*r*)

$$y=(D-E)(x-1)+F \qquad \text{Eq. (5)}$$

(solve Eq. (4) for y)

$$(E-D)x+E=(D-E)(x-1)+F \qquad \text{Eq. (6)}$$

(eliminate y by equating the right hand members of Eq's (3) and (5))

$$Q=x=(F-D)/2(E-D) \qquad \text{Eq. (7)}$$

(solve for x, collect terms and simplify)

In the event that the mirror case is present, where F has the greatest value, then the same Eq. (7) will apply if one simply renames D to be F and F to be D. Also, the case where all three of D, E and F line on a straight line with at least a minimum slope implies an interpolated value of one.

It is probably more trouble than it is worth to detect the three-points-on-a-line condition ahead of time, and sufficient to simply let the answer be computed as one. Whether to take it and keep going is a choice the system designer has to make, since such a case should have been prevented by prediction, and it is for sure that the shape of the Correlation Surface is at some limit of acceptability.

It will be appreciated that the firmware routine to accomplish interpolation according to the principles set out in the preceding several paragraphs ("straight line intersection") are located in System ROM 61. This will not be surprising, since that is exactly where the prior art "fitted parabola" interpolation routines were located.

Now let's consider some extensions and alternate embodiments of such simplified "straight line intersection" interpolation. To begin with, and independent of any spatial filtering, it need not be limited to situations where the Correlation Surface is formed from Reference and Sample Arrays that have been reduced in resolution. Instead, the pixel location comparisons within each trial shift can be the absolute value of intensity ("photo unit") differences; call them "linear absolute differences." These linear absolute differences can be accumulated to produce the values within the Correlation Surface Array. Now use the straight line intersection method of interpolation.

We claim:

1. A method of interpolation to ascertain relative movement along an axis in an optical navigation system, the method comprising the steps of:
   (a) illuminating a work surface to be navigated upon;
   (b) coupling light reflected as an image on the illuminated work surface to an array of photo detectors that produce output signals whose amplitudes represent features in the image;
   (c) digitizing to multiple bits the output signals of step (b) to create a reference array stored in a memory;
   (d) applying a spatial filter to the reference array of step (c) to create a filtered reference array stored in memory, each value in the filtered reference array being a single bit;
   (e) digitizing to multiple bits the output signals of another instance of step (b) to create a sample array stored in memory;
   (f) applying a spatial filter to the sample array of step (e) to create a filtered sample array stored in memory, each value in the filtered sample array being a single bit;
   (g) subsequent to steps (d) and (f), comparing by an exclusive OR operation shifted versions of one of the filtered arrays with an unshifted version of the other, the shifts including one pixel left, one pixel left and one pixel down, one pixel down, one pixel down and one pixel right, one pixel right, one pixel right and one pixel up, one pixel up, and a null shift that is in the center of the foregoing eight shifts, and for each such shift adding to an accumulation the number of exclusive OR operations that indicate differences between bits in the filtered arrays;
   (h) storing, as correlation values, the differences accumulated for each shifted version in the position of a correlation array that corresponds to the shifts of step (g);
   (i) selecting at least three correlation values from the correlation array that represent no trial shifting along one axis and the various remaining trial shifts along the axis to be interpolated on;
   (j) determining which of the correlation values selected in step (i) represents the least correlation;
   (k) associating with the correlation value determined in step (j) an adjacent correlation value from the ones selected in step (i) that is also nearer the center of the correlation array than the one determined in step (j), but that has the same sign of trial pixel shift or is the null shift;
   (l) associating a first straight line with the values of step (k), the coordinate system of the line pixel displacements for the trial shifts as an abscissa and correlation value as an ordinate;
   (m) associating a second straight line with a remaining correlation value corresponding to a trial pixel shift of sign opposite that of step (k) and slope that is the negative of that of the first line, the coordinate system for the second line being the same as for the first line; and
   (n) finding the abscissa of the intersection of the first and second lines.

2. A method as in claim 1 further comprising the steps of:
   (o) examining the correlation values in the correlation array to determine the coarse amount of motion; and
   (p) adding the abscissa found in step (n) to the coarse amount of motion.

3. A method as in claim 2 further comprising the step of sending to a using device a motion signal determined according to step (p).

4. A method of optical navigation to ascertain relative movement along an axis, the method comprising the steps of:
   (a) illuminating a work surface to be navigated upon;
   (b) coupling light reflected as an image on the illuminated work surface to an array of photo detectors that produce output signals whose amplitudes represent features in the image;
   (c) digitizing to multiple bits the output signals of step (b) to create a reference array stored in a memory;
   (d) digitizing to multiple bits the output signals of another instance of step (b) to create a sample array stored in memory;
   (e) subsequent to step (d), finding the absolute difference between each pair of corresponding pixel locations within shifted versions of one of the reference and sample arrays with an unshifted version of the other, the shifts including one pixel left, one pixel left and one pixel down, one pixel down, one pixel down and one pixel right, one pixel right, one pixel right and one pixel up, one pixel up, and a null shift that is in the center of the foregoing eight shifts, and for each such shift adding to an accumulation each absolute difference found;
   (f) storing, as correlation values, the differences accumulated for each shifted version in the position of a correlation array that corresponds to the shifts of step (e);
   (g) selecting at least three correlation values from the correlation array that represent no trial shifting along one axis and the various remaining trial shifts along the axis to be interpolated on;
   (h) determining which of the correlation values selected in step (g) represents the least correlation;
   (i) associating with the correlation value determined in step (h) an adjacent correlation value from the ones selected in step (g) that is also nearer the center of the correlation array than the one determined in step (h), but that has the same sign of trial pixel shift or is the null shift;

(j) associating a first straight line with the values of step (i), the coordinate system of the line pixel displacements for the trial shifts as an abscissa and correlation value as an ordinate;

(k) associating a second straight line with a remaining correlation value corresponding to a trial pixel shift of sign opposite that of step (i) and slope that is the negative of that of the first line, the coordinate system for the second line being the same as for the first line; and (l) finding the abscissa of the intersection of the first and second lines.

5. A method as in claim 4 further comprising the steps of:

(m) examining the correlation values in the correlation array to determine the coarse amount of motion; and (n) adding the abscissa found in step (l) to the coarse amount of motion.

6. A method as in claim 5 further comprising the step of sending to a using device a motion signal determined according to step (n).

* * * * *